United States Patent
Ganapathiappan et al.

(10) Patent No.: US 8,206,497 B2
(45) Date of Patent: Jun. 26, 2012

(54) POLYPHENYLATED PHTHALOCYANINES WITH NEAR-INFRARED ABSORPTION

(75) Inventors: Sivapackia Ganapathiappan, Los Altos, CA (US); Jayprakash Bhatt, Corvallis, OR (US); Hou Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 12/570,902

(22) Filed: Sep. 30, 2009

(65) Prior Publication Data

US 2011/0073005 A1    Mar. 31, 2011

(51) Int. Cl.
  *C09D 11/02*  (2006.01)
  *C09B 47/00*  (2006.01)
  *C07D 487/22* (2006.01)

(52) U.S. Cl. .................... 106/31.49; 540/128; 540/139; 540/140

(58) Field of Classification Search ............... 106/31.49; 540/128, 129, 132, 136, 139, 140, 143, 144
See application file for complete search history.

(56) References Cited

U.S. PATENT DOCUMENTS

| | | | | |
|---|---|---|---|---|
| 4,783,386 A * | 11/1988 | Nikles et al. | .................... | 430/19 |
| 5,087,390 A * | 2/1992 | Sounik et al. | ................. | 540/139 |
| 5,824,799 A * | 10/1998 | Buechler et al. | ............... | 540/128 |
| 6,066,729 A * | 5/2000 | Fujita et al. | .................. | 540/140 |
| 6,468,713 B1 * | 10/2002 | Terao et al. | .................... | 540/139 |
| 7,662,362 B2 * | 2/2010 | Kuppusamy et al. | ......... | 540/145 |

* cited by examiner

*Primary Examiner* — Helene Klemanski
(74) *Attorney, Agent, or Firm* — David W. Collins

(57) ABSTRACT

Polyphenylated phthalocyanine water-soluble dyes with near-infrared absorption comprise four isoindole units linked together in a large ring to form a phthalocyanine macrocycle, with either four anthracenyl groups or four naphthacenyl groups each linked to an isoindole, and a metal atom optionally complexed to the phthalocyanine macrocycle.

13 Claims, No Drawings

POLYPHENYLATED PHTHALOCYANINES WITH NEAR-INFRARED ABSORPTION

BACKGROUND ART

Inkjet printers are now very common and affordable and allow one to obtain decent print quality. They are used in home printing, office printing and commercial printing. In inkjet printers, print heads are used to eject ink droplets very accurately to place them on a desired location on a medium. The print head normally comprises a large number of nozzles, often, more than 400 nozzles. As a general rule, the larger the number of nozzles, the greater is the improvement of the print quality and speed. Frequently, the nozzles become blocked because of the usage of pigmented inks or inks containing particles. Sometimes, one or more nozzle orifices may contain dried ink and fresh ink cannot be ejected. One result of this condition is the formation of streaks, which lead to poor print quality.

Near-infrared (near-IR) absorbing dyes may be added to the ink to monitor the condition of the nozzles. Incorporation of near-IR dyes enables detection of ink ejected by the print head. The detection system attached to the printer always monitors the nozzle health. If the nozzle is clogged, it allows other nozzles to spit the ink on the same spot. Near-infrared materials enable continuous monitoring of nozzles and correcting for clogged nozzles. This ensures consistent high print quality over the life of the printer. This is especially important for newer inkjet printers with permanent print heads. High print quality throughout the life of a permanent print head is a major customer benefit.

Other applications for such dyes exhibiting absorption in the near-IR include security printing, RFID tags, etc. Near-IR absorbing dyes may be employed by extending the conjugation so that the absorption can be shifted to the range of 700 to 1000 nm range.

Many of the technologies utilizing near-IR materials require that these materials be dissolved in organic solvents, water and aqueous or organic solvent blends. Some applications, such as thermal inkjet printing require that the near-IR absorbing material be kept in aqueous solution for long periods of time. Near-IR dyes have to be stable in aqueous solvent blends for a long time without undergoing any kind of chemical change. Any degradation or changes to its physical/chemical nature can destroy the conjugation and thus lose the near-IR absorption. Such changes could adversely affect the desired property (absorption in the near-IR wavelength range) and cannot be used in such applications.

Near-IR dyes of the Cyanine dye class are soluble in water but are chemically unstable in aqueous solutions over a long time at wide pH range and are therefore not suitable for inkjet applications requiring aqueous solution stability for long periods of time.

Phthalocyanine (PC) (metal free or metal complex) are chemically stable but are difficult to solubilize in water. Highly ionic groups or water-soluble ethylene oxide groups have to be attached for dissolving these compounds in water. These compounds are solubilized by attaching water-soluble groups on the benzene rings. But introduction of such groups changes the peak absorption dramatically up to 60 nm.

BEST MODES FOR CARRYING OUT THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "vehicle" or "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. As such, the term "aqueous liquid vehicle" or "aqueous vehicle" refers to a liquid vehicle having water as a major solvent, and often, a predominant solvent.

The term "near infrared" or "near-IR" refers to optical radiation in the range of about 700 nm to 1400 nm. In accordance with embodiments of the present invention, the near-IR dyes of the present disclosure can absorb optical radiation within the near-IR spectrum, and in some embodiments, in the 700 nm to 1000 nm range.

As used herein, "colorant" can include dyes, pigments, and/or other particulates that may be suspended or dissolved in an ink vehicle prepared in accordance with embodiments of the present invention. Dyes are typically water-soluble, and therefore, can be desirable for use in many embodiments. However, pigments can also be used in other embodiments. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle. It is noted that the term "colorant" does not include the near-IR dyes described in accordance with embodiments of the present disclosure, e.g., near-IR dyes generally described in Formula I.

The term "about" when referring to a numerical value or range is intended to encompass the values resulting from experimental error that can occur when taking measurements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As indicated above, current near-IR absorbing compounds are either not soluble in water or not very stable in water or inks. Methods for making such compounds are also difficult. In accordance with the teachings herein, the synthesis of near-IR absorbing phthalocyanine (PC) compounds that are water-soluble or dispersed and that are very stable in water and other solutions such as inkjet ink formulation with a wide range of pH is improved. Only a small quantity of these compounds has to be added to the ink for the desired application, as these compounds exhibit very strong absorption in the near-IR region. These compounds are very soluble because of the presence of water-soluble group(s) such as ethylene oxides on the axial position of the central metal atom. Other water solubilizing groups include, but are not limited to, phosphates, sulfates, ammonium salts, amides, ethylene oxides, propylene oxides, ethylene sulfide, and propylene sulfide. Moreover, these compounds are also very stable because of the rigid PC ring network.

A phthalocyanine is a macrocyclic compound having an alternating nitrogen atom-carbon atom ring structure, essentially comprising four isoindole units linked together in a large ring (macrocycle). The molecule is able to coordinate hydrogen and metal cations in its center by coordinate bonds with the four isoindole nitrogen atoms. The central atoms can carry additional ligands. Most of the elements of the Periodic Table have been found to be able to coordinate to the phthalocyanine macrocycle. Therefore, a variety of phthalocyanine complexes exist.

In accordance with embodiments of the teachings herein, fused phthalocyanine compounds are provided with three or four fused benzene rings ("polyphenylated phthalocyanines") that are water-soluble or dispersible in aqueous solutions or aqueous blend solutions and stable over a wide pH range. Three fused ring systems are called anthracene derivatives or anthralocyanines, while four fused ring systems are called naphthacene derivatives. In either case, the compounds herein may be referred to as "modified phthalocyanine" or "modified PC" dyes.

Fused ring systems increase the wavelength of absorption for the desired applications. The presence of fused benzene rings with conjugation increases the wavelength of absorption. This increase helps to use with the desired application having the sensor sensitive to that absorption. These dyes exhibit absorptions in the near-infrared range 700 to 1000 nm. They find applications in a wide variety of fields, including security applications, printing, print authenticity, special media, RFID tags etc.

Phthalocyanine (PC) (metal-free or metal complex) compounds are chemically stable. Most of them exhibit absorptions less than 800 nm. Some applications require that the absorptions in the range of 800 to 1000 nm. Moreover these compounds do not dissolve in water or solvents. Highly polar groups like sulfonates, phosphates or water-soluble ethylene oxide groups have to be attached for dissolving these compounds in water.

The general structures of water-soluble dyes are disclosed in which the water-soluble groups are present on the anthracenyl ring structures as shown in Formula (I) below. Some examples are illustrated in Formulae (II) and (III), in which four anthracene rings are employed. Examples in which four naphthacene rings are employed are illustrated in Formulae (IV) and (V). The precursors used for incorporating water-soluble groups are shown in Formulae (VI) and (VII).

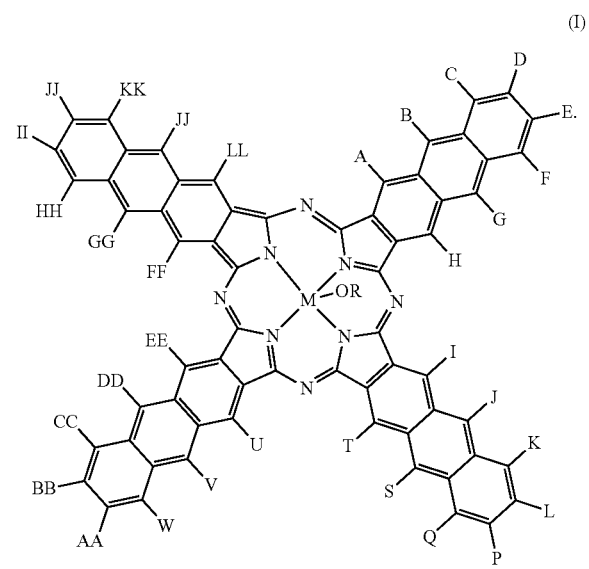

(I)

Formula (I) depicts the general structure of phthalocyanines with fused benzene rings. In this structure:

M can be metal-free or any metal of the Periodic Table, for example, copper, titanium, vanadium, manganese, iron, nickel, cobalt, indium, tin, gallium, scandium, yttrium, silicon, and germanium;

R=H, alkyl, $SO_3M'$, or $(C_2H_4O)_mCH_3$, where M'=monovalent cations such as $Na^+$, $K^+$, or $NH_4^+$ and m=1 to 1000;

OR may be replaced by a halide, such as F, Cl or Br;

the number of OR groups depends up on the valency of the metal atom—if the valency of metal M is three, then one OR group is present, while if the valency of metal M is four, then two OR groups is present; and the substituents, A to L, P, Q, S to W, AA, BB, CC, DD, EE, FF, GG, HH, II, JJ, KK, LL can be independently monovalent groups such as H, halides such as F, Cl, Br or I, OH, alkyl, OCO-alkyl, COO-alkyl, $SO_3$ M', COOM', $PO_3M'_2$, $N(alkyl)_4^+$ and $(C_2H_4O)_mCH_3$ and at least one of the substituents is selected from the group of SO$_3$M', COOM', PO$_3$M'$_2$, N(alkyl)$_4^+$ and (C$_2$H$_4$O)$_m$CH$_3$. Some specific examples are shown below in Formulae (II)-(V).

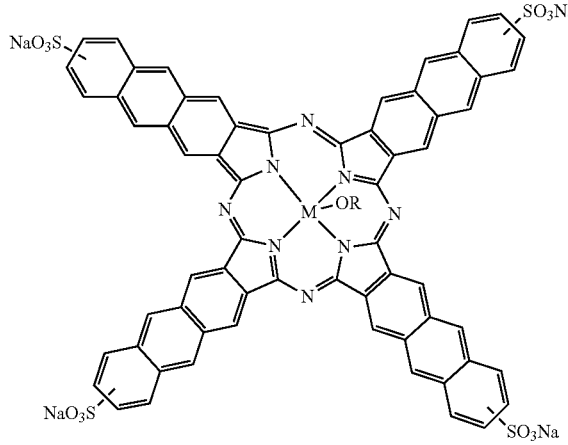

(II)

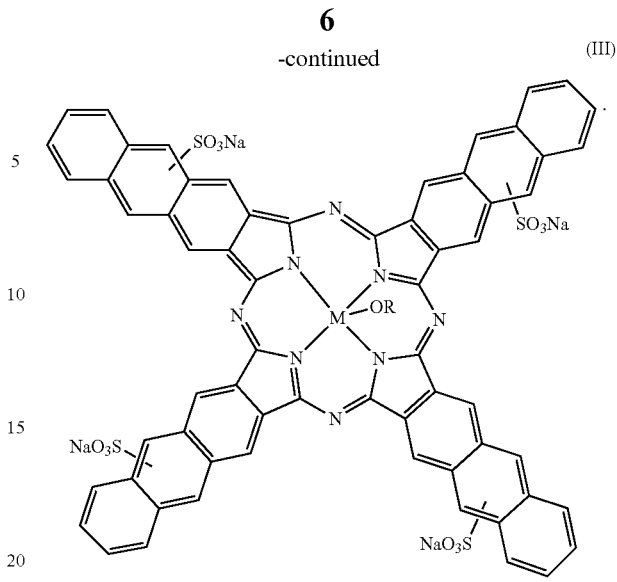

Formulae (II) and (III) show two specific examples of phthalocyanines with three fused benzene rings (anthracenyl groups) with water-soluble groups, where M=In and R=H or SO$_3$Na or OR is replaced with Cl. The water-soluble groups may be on the end or terminal ring (Formula (II)) or the penultimate ring (Formula (III)), for example.

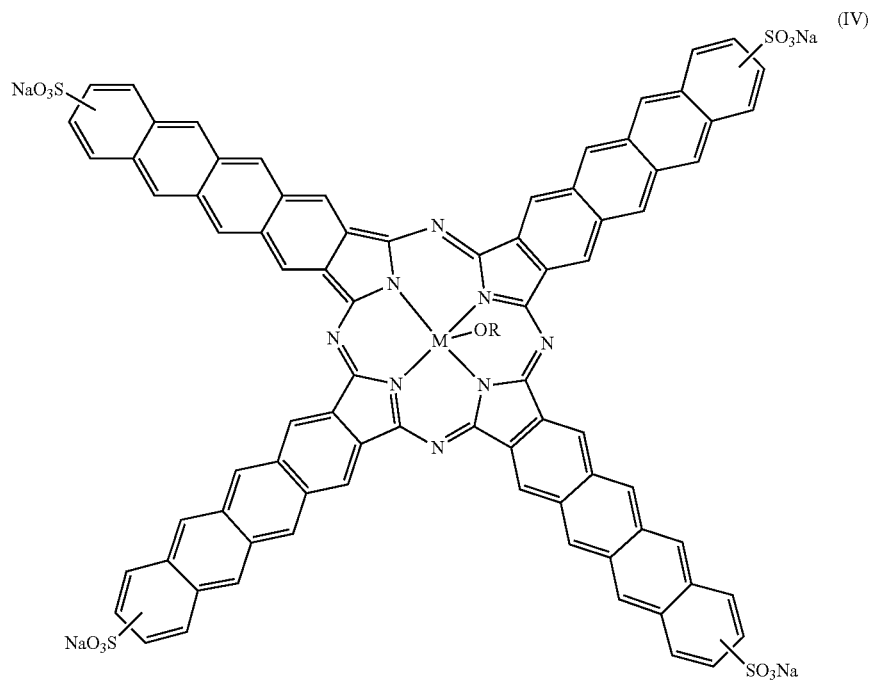

(IV)

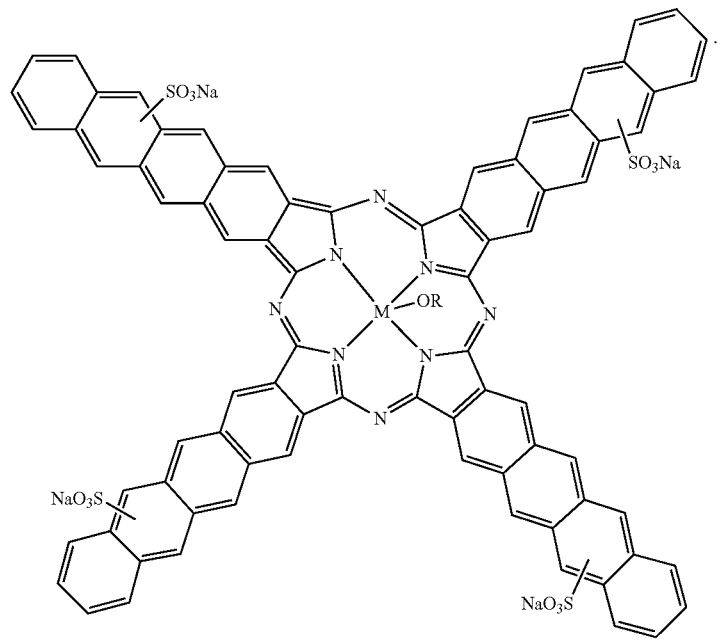

(V)

Formulae (IV) and (V) show two specific examples of phthalocyanines with four fused benzene rings (naphthacenyl groups) with water-soluble groups, where M=In and R=H or SO₃Na or OR is replaced with Cl.

The precursors for making structures given in Formulae (II) and (III) are illustrated in Formula (VI).

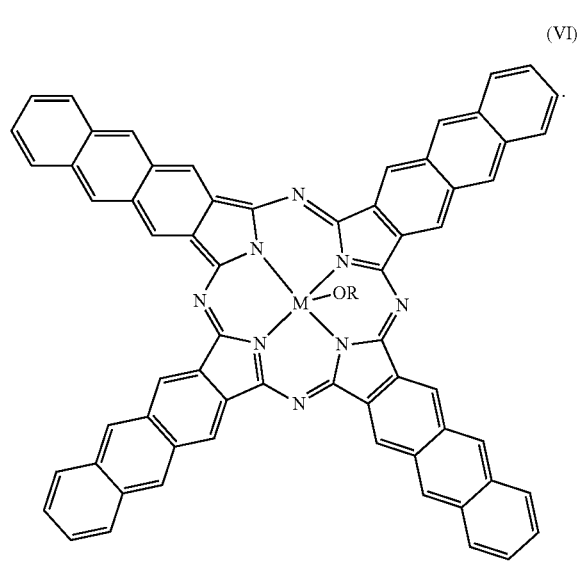

(VI)

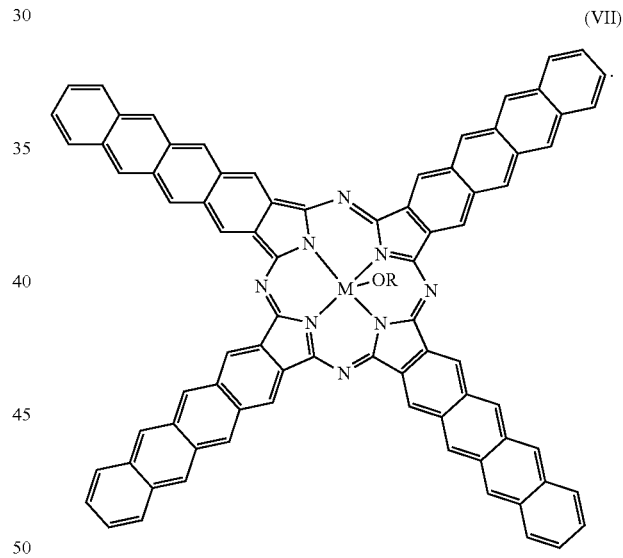

(VII)

Formula (VII) shows the precursor for making the structures in Formulae (IV) and (V), where M=In and R=OCOCH₃, —OCOCH₂COCH₃, or —OCH₃ or OR is replaced with Cl or Br.

These dyes are prepared from the corresponding metal compound and appropriate dicyano, dicarboxylic acid or anhydride. For example, the phthalocyanine with three fused rings (anthracenyl phthalocyanine) is prepared by treating 2,3-anthracenedicarbonitrile with indium chloride using ammonium molybdate as catalyst. Then the pigment obtained is sulfonated with fuming sulfuric acid and then the water-soluble sulfonic acid obtained was neutralized with base such as sodium carbonate to obtain the sodium salt of the dye. Similarly, the four fused benzene ring system (naphthacenyl phthalocyanine) can be prepared. The foregoing should be sufficient to enable the person skilled in the art to make these compounds, and further in light of Examples 1 and 2, below.

Considerations Relating to Inks

In addition to the near-infrared absorbing compounds described herein as well as the inks containing such compounds, the present disclosure provides a method of printing such compounds and inks. In one embodiment, a method of printing any of the near-infrared absorbing compounds described herein can comprise printing an ink-jet ink containing the near-infrared absorbing compound with an ink-jet printer.

Generally, ink-jet printers contain ink-jet ink print heads that are used to eject ink droplets accurately at precise locations on print media. As such, ink-jet printers can contain from several nozzles in the print head to more than 400 nozzles. A high population of nozzles can increase the print quality and speed of the ink-jet printing. However, frequently, the nozzles get blocked because of the usage of pigmented inks or inks containing particles, such as binders, resins, latexes, etc. As such, streaks can occur, which leads to poor print quality.

Ink-jet printers having near-infrared absorbing compounds in the ink-jet ink can be coupled to a detection system used to monitor nozzle health. Generally, the detection system monitors the ink ejected from the nozzles by detecting the near-infrared absorbing compound in the ink-jet ink. If the detection system fails to detect the near-infrared absorbing compound, the printer can ascertain that such nozzle is blocked or otherwise faulty and adjust the printing by using a different nozzle(s), thereby maintaining print quality and performance.

Additionally, the present ink-jet inks can provide security features. The present near-infrared absorbing compounds can be tailored to absorb specific wavelengths. Once an ink-jet ink has been manufactured with a near-infrared absorbing compound described herein, such an ink can be characterized by determining the absorption of the ink in the near-infrared wavelength region. After such information is determined and catalogued, the ink-jet ink can be printed and subsequently verified for its particular absorption. The ink could then be used to determine the authenticity of the print.

Additionally, the present near-infrared absorbing compounds can provide increased stability by increasing the extinction coefficient of the near-infrared absorbing compounds. As such, the present near-infrared absorbing compounds allow for an ink-jet ink formulation having a smaller quantity of the near-infrared absorbing compounds, leading to lower production costs.

The inks of the present disclosure can be used with commercially available ink-jet printers, such as DESKJET® or PHOTOSMART® and other similar printers manufactured by Hewlett-Packard Company. It is notable that these inks are acceptable for use with both thermal ink-jet ink printers and piezo ink-jet printers. They can also be used with off-axis printers, which have a high demand with respect to maintaining a reliable ink with low incidences of clogging. Further, these ink sets can produce true colors on a variety of media, including uncoated media, clay coated media, inorganic porous coated media, e.g., silica- and alumina-based media, and organic swellable media, e.g., gelatin coated media, each with improved light fastness, gamut, and other print quality enhancements.

As previously discussed, the inks of the present invention can include a colorant in the form or a dye and/or pigment. In one embodiment, the ink can be a cyan ink, magenta ink, yellow ink, pale cyan ink, pale magenta ink, green ink, blue ink, orange ink, pink ink, gray ink, etc. Additionally, multiple inks can be used to form an ink set for use with the printers described herein. As such, a printer can have from one to multiple dyes in a single ink, each having more than one dye load, and/or multiple dyes in over an ink set. Some or all of the inks in an ink set can additionally include the near-IR dyes described herein, or an ink might include a near-IR dye described herein without the presence of another colorant. The typical colorant range is about 0.1% to 6% by weight of the total ink composition.

A typical liquid vehicle formulation that can be used with a dye set of the present invention can include one or more organic co-solvent(s), present in total at from 5.0% to 50.0% by weight, and one or more non-ionic, cationic, and/or anionic surfactant(s), present from 0.01% to 10.0% by weight. The balance of the formulation can be purified water, or other vehicle components known in the art such as biocides, viscosity modifiers, pH adjusting agents, sequestering agents, preservatives, anti-kogation agents, bleed control agents, drying agents, jettability agents, and the like.

The concentration of the modified PC dyes disclosed herein for use in the foregoing typical formulation ranges from about 0.0001% to 3% by weight of the ink, in addition to colorant (dyes and/or pigments) described above. In some embodiments, the concentration of the modified PC dyes may range from about 0.005% to 0.5% by weight of the ink. The concentration of the modified PC dyes depends on the extinction coefficient of the dye for detection. If the extinction coefficient of the modified PC dye is comparatively high, then a lower dye concentration may be employed and vice versa.

Some modified PC dyes may have lower extinction coefficient and therefore may need higher concentration in the ink. Some unique applications may also require use of higher concentration of modified PC dyes in the ink Classes of co-solvents that can be used can include aliphatic alcohols, aromatic alcohols, diols, glycol ethers, polyglycol ethers, caprolactams, form amides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include 2-pyrrolidinone, derivatized 2-pyrrolidinone including 1-(2-hydroxyethyl)-2-pyrrolidinone, 2-methyl-1,3-propanediol, tetraethylene glycol, and ethylhydroxypropanediol (EHPD), to name a few.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Specific examples of preferred surfactants for use include SOLSPERSE, TERGITOL, DOWFAX, and the like. The amount of surfactant added to the formulation, if included, may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other anti-microbial agents, which are routinely used in ink formulations. Examples of suitable microbial agents include, but are not limited to, NUOSEPT, UCARCIDE, VANCIDE, PROXEL, and combinations thereof.

Sequestering agents, such as EDTA (ethylenediaminetetraacetic acid), may be included to eliminate the deleterious effects of metal impurities. Such sequestering agents, if present, typically comprise from 0.01 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethyl-ethanolamine; hydrochloric acid; and other basic or acidic components. If used, pH adjusting agents typically comprise less than about 10 wt % of the ink-jet ink composition. Similarly, buffering agents can be used such as, but not limited to, TRIS, MOPS, citric acid, acetic acid, MES, etc. If used, buffering agents typically comprise less than about 3 wt % of the ink-jet ink composition and generally from about 0.01 wt % to 2 wt %, most commonly from 0.2 wt % to 0.5 wt %. Additionally, anti-kogation agents that can be used include lithium phosphate, sodium phosphate, phosphate esters of fatty alcohol alkoxylates, and the like, in amounts from about 0.01 wt % to 5 wt %. To further illustrate embodiment(s) of the present disclosure, the following examples are given herein. It is to be understood that these examples are provided for illustrative purposes and is not to be construed as limiting the scope of the disclosed embodiment(s).

EXAMPLES

Example 1

2,3-Dicyanoanthracene (2 g) is mixed with indium chloride (0.5 g) and ammonium molybdate (0.03 g) in dimethyl formamide (1 ml). This mixture is heated to 220° C. for 2 h. It is cooled to ambient temperature. The resulting solid is washed with isopropyl alcohol and dried to obtain the precursor pigment of Formula VI with M=In and OR=Cl.

Example 2

The pigment obtained from Example 1 (2 g) is mixed with fuming sulfuric acid containing 20% sulfur trioxide (14 ml) and stirred at ambient temperature for 24 h. The resulting mixture is poured in crushed ice and the product obtained is washed with cold water. The dye is collected and neutralized with sodium carbonate to a pH of 7.2. The product can be further purified by dialysis against water. Water from the dye is removed to obtain a water-soluble dye of Formula II with M=In and OR=Cl.

What is claimed is:

1. Polyphenylated phthalocyanine water-soluble dyes with near-infrared absorption comprising four isoindole units linked together in a large ring to form a phthalocyanine macrocycle, with either four anthracenyl groups or four naphthacenyl groups each linked to an isoindole, and a metal atom optionally complexed to the phthalocyanine macrocycle, wherein the dyes have the general formula:

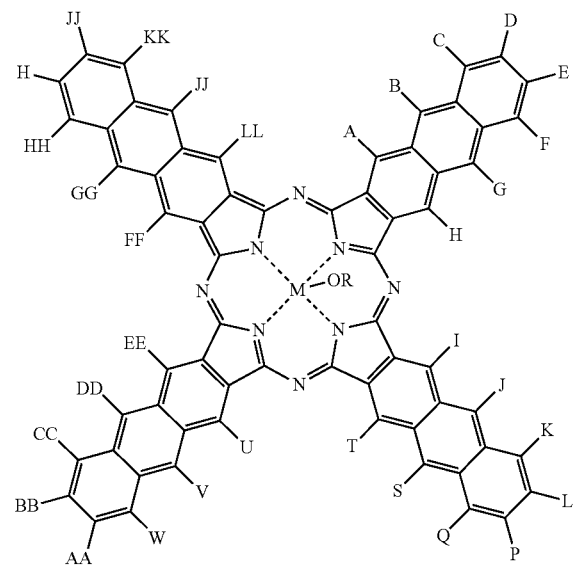

wherein:
M is metal-free or can be any metal of the Periodic Table;
R=H, alkyl, $SO_3M'$ or $(C_2H_4O)_mCH_3$;
M'=monovalent cations;
m=1 to 1000;
the number of OR groups depends upon the valency of the metal atom M; and
the substituents, A to L, P, Q, S to W, AA, BB, CC, DD, EE, FF, GG, HH, II, JJ, KK, LL are independently monovalent groups and wherein the number of fused benzene rings is 4, the dyes having the structure of formulae (IV) or (V) below:

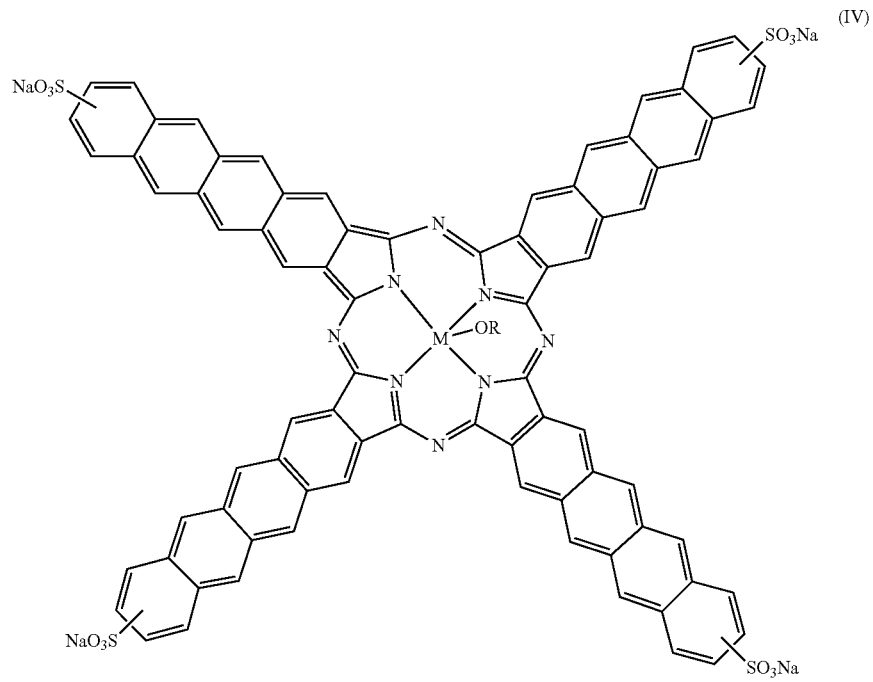

(IV)

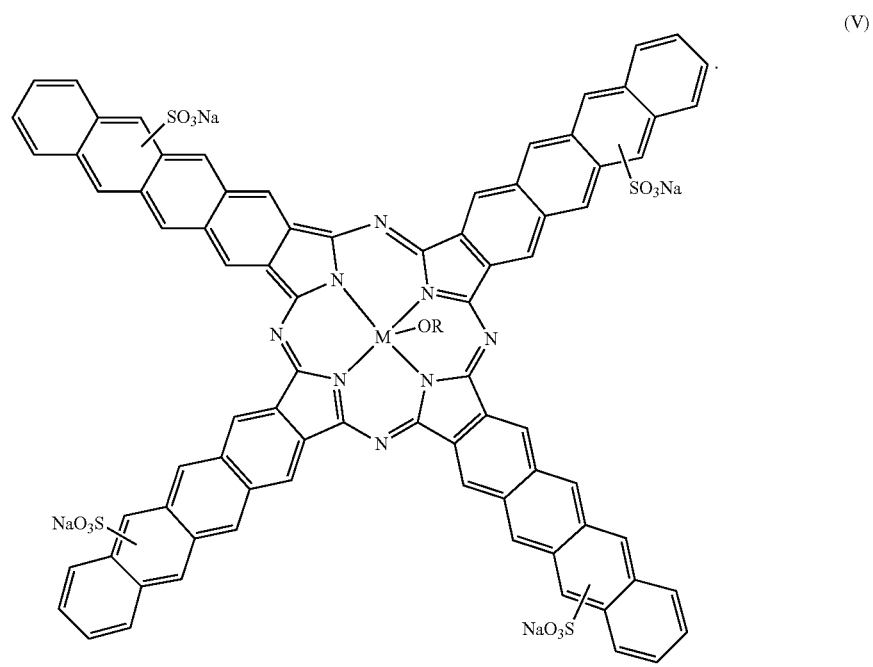

(V)

2. The dye of claim 1 wherein M is selected from the group consisting of copper, titanium, vanadium, manganese, iron, nickel, cobalt, indium, tin, gallium, scandium, yttrium, silicon, and germanium.

3. The dye of claim 1 wherein M' is selected from the group consisting of $Na^+$, $K^+$, and $NH_4^+$.

4. The dye of claim 1 wherein the substituents are selected from the group consisting of H, halides selected from the group consisting of F, Cl, Br, and I, OH, alkyl, OCO-alkyl, COO-alkyl, $SO_3M'$, COOM', $PO_3M'_2$, $N(alkyl)_4^+$ and $(C_2H_4O)_mCH_3$ and at least one of the substituents is selected from the group of $SO_3M'$, COOM', $PO_3M'_2$, $N(alkyl)_4^+$ and $(C_2H_4O)_mCH_3$.

5. The dye of claim 1 wherein OR in the formula is replaced with a halide selected from the group consisting of F, Cl, and Br.

6. An inkjet ink formulation comprising:
(a) an aqueous vehicle;
(b) at least one dye or pigment; and
(c) at least one polyphenylated phthalocyanine water-soluble dye with near-infrared absorption comprising four isoindole units linked together in a large ring to form a phthalocyanine macrocycle, with either four anthracenyl groups or four naphthacenyl groups each linked to an isoindole, and a metal atom optionally complexed to the phthalocyanine macrocycle.

7. The inkjet ink of claim 6 having the general formula (I):

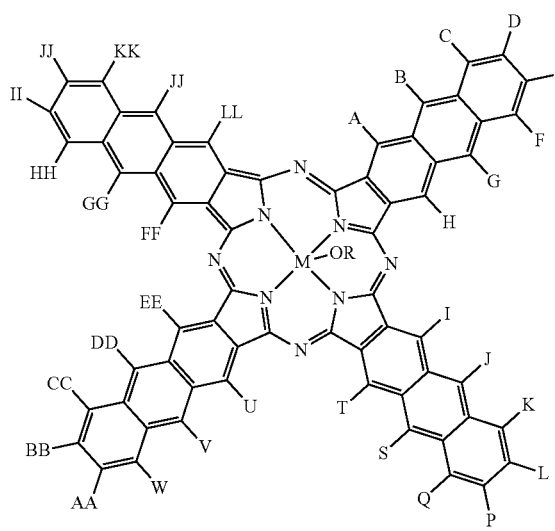

(I)

wherein:
M is metal-free or can be any metal of the Periodic Table;
R=H, alkyl, $SO_3M'$, or $(C_2H_4O)_mCH_3$;
M'=monovalent cations;
m=1 to 1000;
the number of OR groups depends upon the valency of the metal atom M; and
the substituents, A to L, P, Q, S to W, AA, BB, CC, DD, EE, FF, GG, HH, II, JJ, KK, LL are independently monovalent groups.

8. The inkjet ink of claim 7 wherein M is selected from the group consisting of copper, titanium, vanadium, manganese, iron, nickel, cobalt, indium, tin, gallium, scandium, yttrium, silicon, and germanium.

9. The inkjet ink of claim 7 wherein M' is selected from the group consisting of $Na^+$, $K^+$, and $NH_4^+$.

10. The inkjet ink of claim 7 wherein the substituents are selected from the group consisting of H, halides selected from the group consisting of F, CL, Br, and I, OH, alkyl, OCO-alkyl, COO-alkyl, $SO_3M'$, COOM', $PO_3M'_2$, $N(alkyl)_4^+$ and $(C_2H_4O)_mCH_3$ and at least one of the substituents is selected from the group of $SO_3M'$, COOM', $PO_3M'_2$, $N(alkyl)_4^+$ and $(C_2H_4O)_mCH_3$.

11. The inkjet ink of claim 7 wherein OR in the formula is replaced with a halide selected from the group consisting of F, CL, and Br.

12. The inkjet ink of claim 7 wherein the number of fused benzene rings is 3, having the structure of formulae (II) or (III) below:

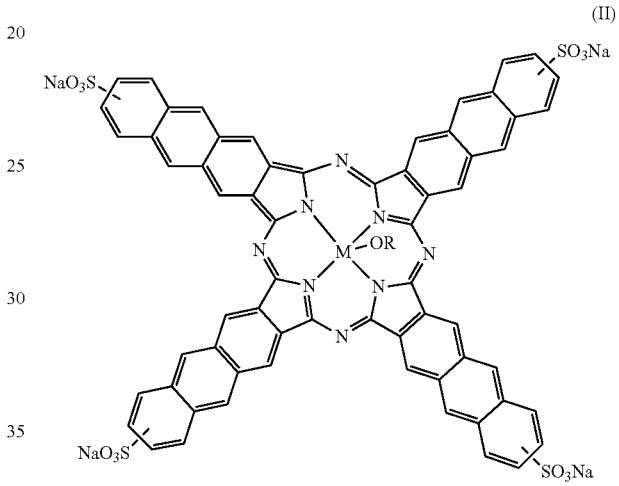

(II)

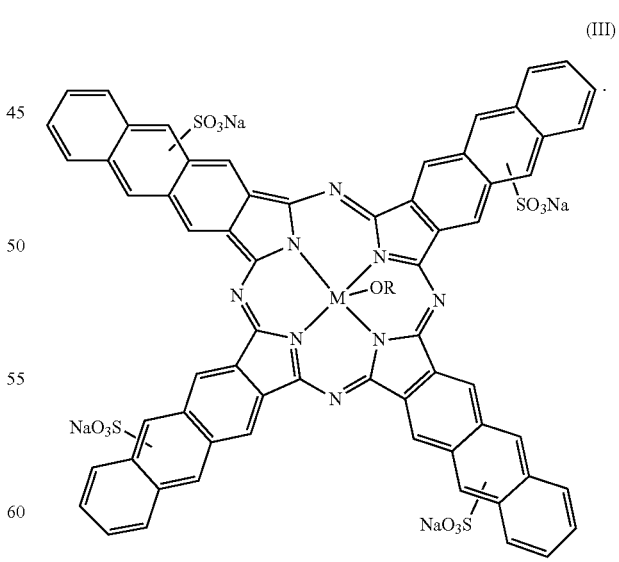

(III)

13. The inkjet ink of claim 7 wherein the number of fused benzene rings is 4, having the structure of formulae (IV) or (V) below:

(IV)
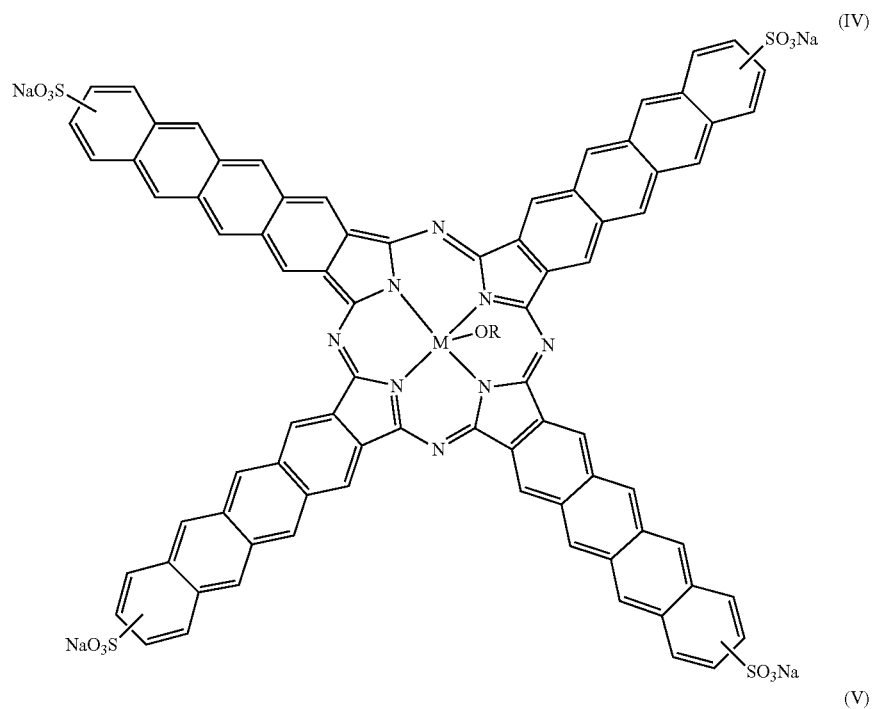
(V)
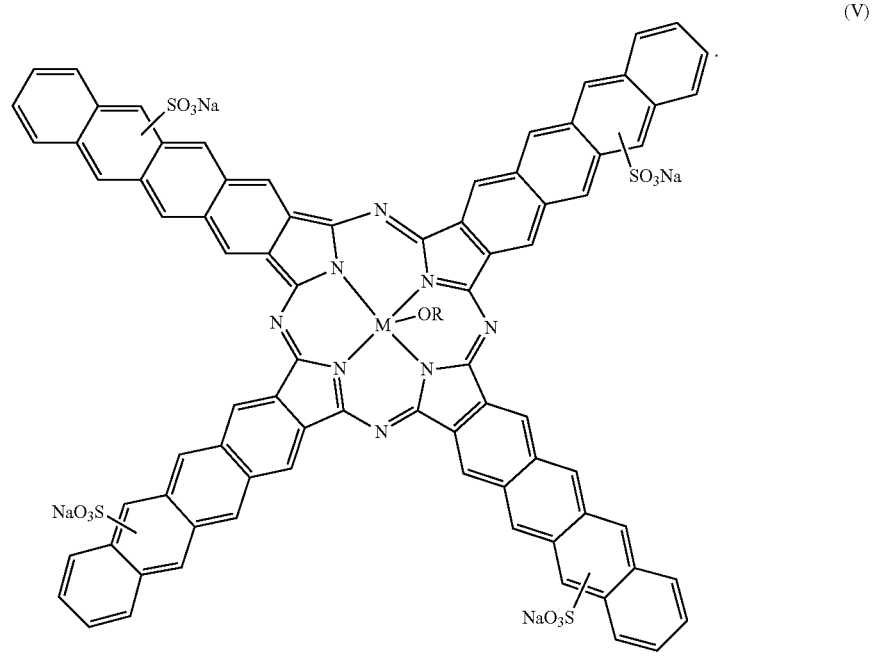
* * * * *

UNITED STATES PATENT AND TRADEMARK OFFICE
CERTIFICATE OF CORRECTION

PATENT NO. : 8,206,497 B2
APPLICATION NO. : 12/570902
DATED : June 26, 2012
INVENTOR(S) : Sivapackia Ganapathiappan et al.

It is certified that error appears in the above-identified patent and that said Letters Patent is hereby corrected as shown below:

In column 12, lines 19-20, in Claim 1, delete "naphtha-cenyl" and insert -- naphthacenyl --, therefor.

In column 12, line 56, in Claim 1, delete "$SO_3M'''$" and insert -- $SO_3M'$, --, therefor.

In column 14, line 62, in Claim 4, delete "CI," and insert -- Cl, --, therefor.

In column 14, line 63, in Claim 4, delete "$SO_3\ M'''$" and insert -- $SO_3M'$ --, therefor.

In column 14, line 63, in Claim 4, delete "$N(alkyl)_4^+and$" and insert -- $N(alkyl)_4^+$ and --, therefor.

In column 14, line 65, in Claim 4, delete "$N(alkyl)_4^+and$" and insert -- $N(alkyl)_4^+$ and --, therefor.

In column 16, line 1, in Claim 10, delete "CL," and insert -- Cl, -- therefor.

In column 16, line 2, in Claim 10, delete "$N(alkyl)_4^+and$" and insert -- $N(alkyl)_4^+$ and --, therefor.

In column 16, line 4, in Claim 10, delete "$N(alkyl)_4^+and$" and insert -- $N(alkyl)_4^+$ and --, therefor.

In column 16, line 9, in Claim 11, delete "CL," and insert -- Cl, --, therefor.

Signed and Sealed this
Twenty-ninth Day of January, 2013

David J. Kappos
*Director of the United States Patent and Trademark Office*